April 7, 1953 — C. S. DIXON — 2,634,152
LIFTING TONGS
Filed Dec. 26, 1945
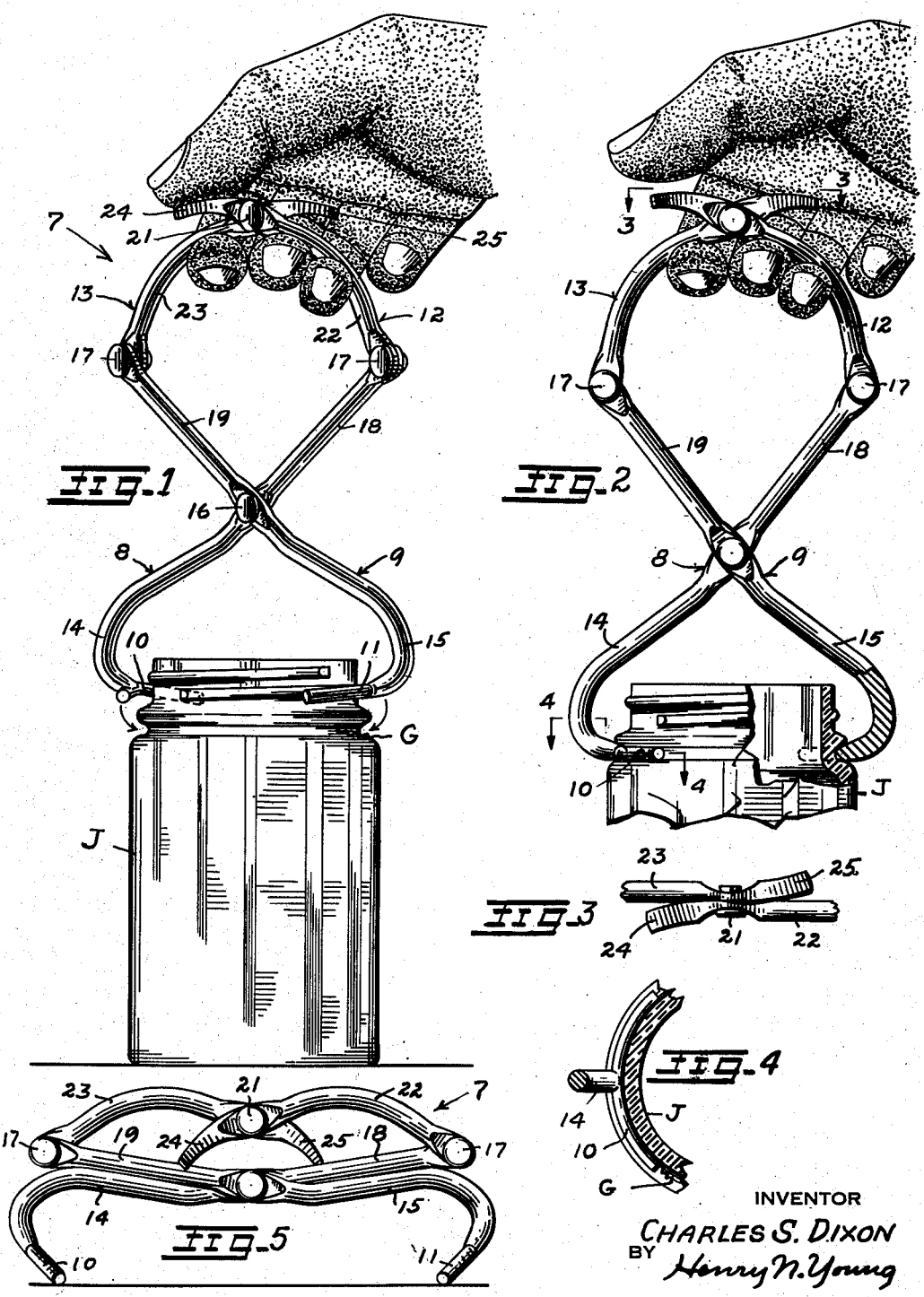
INVENTOR
CHARLES S. DIXON
BY Henry N. Young
ATTORNEY Patented Apr. 7, 1953

2,634,152

UNITED STATES PATENT OFFICE 2,634,152

LIFTING TONGS

Charles S. Dixon, Oakland, Calif.

Application December 26, 1945, Serial No. 637,160

4 Claims. (Cl. 294—31)

The invention relates to a tongs which is arranged for use in lifting and carrying such articles as filled fruit jars.

A general object of the invention is to provide a tongs of the character described which may be operatively applied and released by the use of but one hand.

Another object is to provide a tongs of the character described so arranged that the weight of an article supported therefrom is arranged to provide and maintain the grip of the tongs upon the article.

A further object is to provide a tongs which may be opened for its application or released from an engaged article while supported by the user's hand.

The invention possesses other objects and features of advantage, some of which, with the foregoing, will be set forth or be apparent in the following description of a typical embodiment thereof, and in the accompanying drawings, in which, Figure 1 illustrates an open tongs positioned for its gripping engagement with the top of a fruit jar.

Figure 2 shows the tongs as gripping and supporting the jar, mutually engaged portions of the tongs and jar being shown in section.

Figure 3 is a fragmentary plan view of the tongs taken at the line 3—3 in Figure 2.

Figure 4 is an enlarged stepped section at the line 4—4 in Figure 2.

Figure 5 shows the tongs in a collapsed or contracted condition.

The features of my invention are herewith disclosed as incorporated in the structure of a tongs 7 which essentially comprises a pair of crossed and mutually interpivoted levers 8 and 9 provided with complementary work-engaging jaws 10 and 11 respectively at corresponding ends and having their other ends pivotally connected to a pair of crossed and mutually interpivoted levers 12 and 13. The lever elements 8 and 9 and 12 and 13 of the present tongs are formed of round wire or the like, and are flattened at their points of mutual pivoting, as illustrated.

The jaw arms 14 and 15 of the lever members 8 and 9 respectively have their terminal portions curved toward each other and mount arcuate members across their ends as comprising the jaws 10 and 11. A double-headed hinge pin 16 provides the mutually hinged connection of the levers 8 and 9, the relatively straight arms 18 and 19 of the members 8 and 9 respectively are unitarily attached to the levers 12 and 13 by means of double-headed hinge pins 17, and the members 12 and 13 are hingedly connected by a double-headed pin 21; it will be understood, however, that some or all of the hinge pins may comprise bolts or the like.

The arms 22 and 23 of the levers 12 and 13 which are hingedly connected to the levers 8 and 9 are arcuately curved in a mutually complementary manner to provide a generally sector-shaped space between them and the arms 18 and 19 of the levers 8 and 9. The other arms 24 and 25 of the levers 12 and 13 extend as curved continuations of the arms 22 and 23, and are more or less flattened in a direction across the plane of the tongs to provide rests for a user's thumb or finger which is applied for purposes to be hereinafter brought out. It is noted that the arms 22 and 23 of the members 12 and 13 respectively are generally operative as links, and that the arms 24 and 25 may be considered as extensions thereof for descriptive purposes.

The present tongs arrangement is essentially such that the support of the tongs alone by fingers supportingly engaged beneath the lever arms or links 22 and 23 will urge a relative closing movement of the jaws, yet the supported tongs may be opened for application while so carried by pressing upon one or both of the arms 24 and 25. More specifically, the tongs opening is effected by pressing the arm 24 toward the link 23 and/or the arm 25 toward the link 22 between digits of the supporting hand.

Figure 1 shows a person's thumb applied for separating the jaws of the tongs for their disposal opposite the usual groove G provided below the threaded neck of a usual fruit jar J, the thumb having been pressed toward the fingers engaged beneath the arms 22 and 23 only as far as needed to open the tongs for its application to the jar. When the jaws of the tongs have been positioned opposite the groove G, a raising of the thumb from the engaged lever arm permits a gripping of jar by reason of the action of gravity on the finger-supported tongs structure; this feature is brought out in Figure 2. A jar so gripped may be lifted with the applied fingers, its weight adding proportionally to the grip provided by the jaws. The described digit control of the tongs during its application and use is considered a particularly important feature of the present invention.

In the present structure, the jaw arms 14 and 15 of the lever members 8 and 9 are of like effective length, as are the arms 18 and 19 of said members. The arcuate arms 22 and 23 of the complementary members 12 and 13 are also of like length. Accordingly, it will be understood that the present tongs structure is symmetrical with respect to the common plane of the hinge pins 16 and 21. Furthermore, and as shown, the arms or links 22 and 23 may have the same effective length as the lever arms 18 and 19 whereby the quadrangle defined by said arms comprises a parallelogram; the latter relation permits a longitudinal collapse or folding of the tongs structure into the particularly compact non-use form shown for it in Figure 5.

From the foregoing description taken in connection with the accompanying drawings, the advantages of the construction and operation of the present device will be readily understood by those skilled in the art to which this invention appertains. While I have described the features and principles of operation of an assembly which I now consider to comprise a preferred embodiment of my invention, I desire to have it understood that the showing is primarily illustrative, and that such changes and developments may be made, when desired, as fall within the scope of the following claims.

I claim:

1. A hand-controlled lifting tongs comprising a pair of intermediately pivoted levers providing gripping jaws at the ends of corresponding arms thereof, handle links directly pivoted at corresponding ends thereof to the ends of the other lever arms and mutually pivoted at their other ends and constantly cooperative with the latter lever arms to define a finger-receiving opening, and a thumb rest extending fixedly and longitudinally from a said link and opposite the other link in constant acute-angle relation thereto.

2. Lifting tongs including a pair of crossed and directly pivoted levers providing complementary jaws at corresponding ends thereof for grippingly engaging an object between them, and links directly pivoted at corresponding ends thereof to the ends of the other lever arms and mutually pivoted, said links constantly defining with the last lever arms an opening providing for the insertion therethrough of fingers of a person's hand in side-by-side relation beneath them and adjacent their mutual pivot point so that a raising of a hand having fingers thereof engaged with and beneath the links is alone operative to effect a gripping of an object disposed beneath the jaws and a lifting support of the gripped object, one of said links being provided with a continuing extension disposed solely opposite the other link outwardly thereof and arranged for a displacement to a substantially aligned relation with the latter solely by pressure between the digits of the supporting hand for effecting a separation of the jaws to release the supported object.

3. Lifting tongs including a pair of crossed and directly pivoted levers providing complementary jaws at corresponding ends thereof for grippingly engaging an object between them, a second pair of crossed and directly pivoted levers having the ends of corresponding arms thereof pivoted to the jawless ends of the first levers and cooperative therewith to constantly define an opening for receiving a finger of a hand to supportingly engage an opening-defining arm of a lever of the second pair, the other arm ends of the second levers comprising digit rests opposite the different first arms thereof in acute-angle relation thereto for swinging toward them to open the jaws.

4. Lifting tongs including a pair of crossed and pivoted levers providing complementary jaws at corresponding ends thereof for grippingly engaging an object between them, a second pair of crossed and pivoted levers having corresponding arm ends thereof directly pivoted to the ends of the first levers which are opposite their jaw ends, the connected arms of the second levers being arcuately bowed outwardly of their lines to constantly and cooperatively provide below them an arched top opening for freely receiving fingers of a person's hand in side-by-side relation beneath them and adjacent their mutual pivot point so that a raising of a hand having fingers thereof engaged beneath the arms is operative to effect a gripping of an object disposed between the jaws and a supported lifting of a gripped object, the other arm ends of the second levers comprising thumb rests arranged for selective pressure engagement by the thumb of a hand having fingers thereof supporting the tongs whereby to urge mutual alignment of the levers to separate the jaws of the first levers for releasing the object gripped thereby.

CHARLES S. DIXON.

REFERENCES CITED

The following references are of record in the file of this patent:

UNITED STATES PATENTS

| Number | Name | Date |
|---|---|---|
| 526,559 | Burch | Sept. 25, 1894 |
| 718,790 | Pervier | Jan. 20, 1903 |
| 919,723 | Hilckmann | Apr. 27, 1909 |
| 1,833,342 | Tomilson | Nov. 24, 1931 |
| 2,436,053 | Mundahl | Feb. 17, 1948 |

FOREIGN PATENTS

| Number | Country | Date |
|---|---|---|
| 176,217 | Great Britain | Mar. 9, 1922 |